United States Patent [19]
Marusue et al.

[11] Patent Number: 5,320,000
[45] Date of Patent: Jun. 14, 1994

[54] SHIFT CONTROL SYSTEM FOR AUTOMOBILE AUTOMATIC TRANSMISSION

[75] Inventors: Toshihisa Marusue; Hidehiko Mishima, both of Hiroshima, Japan

[73] Assignee: Mazda Motor Corporation, Hiroshima, Japan

[21] Appl. No.: 949,211

[22] Filed: Sep. 23, 1992

[30] Foreign Application Priority Data

Sep. 25, 1991 [JP] Japan .................. 3-246056

[51] Int. Cl.⁵ .............................. F16H 61/08
[52] U.S. Cl. ........................ 477/154; 477/155
[58] Field of Search ........... 74/866, 867, 335, 336 R

[56] References Cited

U.S. PATENT DOCUMENTS

| | | | |
|---|---|---|---|
| 4,674,364 | 6/1987 | Shindo et al. | 74/866 X |
| 4,934,215 | 6/1990 | Miura et al. | 475/283 |
| 4,984,485 | 1/1991 | Kojima et al. | 74/866 |
| 5,067,373 | 11/1991 | Kyohzuka et al. | 74/866 |
| 5,094,130 | 3/1992 | Hirose et al. | 74/866 X |
| 5,131,298 | 7/1992 | Marusue | 74/866 |
| 5,195,036 | 3/1993 | Kimura et al. | 74/866 X |

FOREIGN PATENT DOCUMENTS

62-4950  1/1987  Japan .

*Primary Examiner*—Dirk Wright
*Attorney, Agent, or Firm*—Keck, Mahin & Cate

[57] ABSTRACT

A particular shift control system is provided for an automatic transmission having a primary transmission, changeable to at least three primary gear ratios, and a secondary transmission, changeable to at least two secondary gear ratios. The primary and secondary transmissions combine to shift the automatic transmission to a plurality of forward speeds. The control system monitors the progression of change in the primary transmission gear ratio. In a specific automotive drive condition, the primary transmission changes from one primary gear ratio to another primary gear ratio via an intermediate primary gear ratio between the two primary gear ratios. This produces an increase or decrease in a primary gear ratio. At the same time, the secondary transmission decreases or increases, respectively, a secondary gear ratio so as to shift the automatic transmission from one forward speed to another, skipping an intermediate speed between the two forward speeds. The secondary transmission starts a change in a secondary gear ratio in an opposite direction only when a primary gear ratio of the primary transmission reaches the intermediate primary gear ratio.

6 Claims, 5 Drawing Sheets

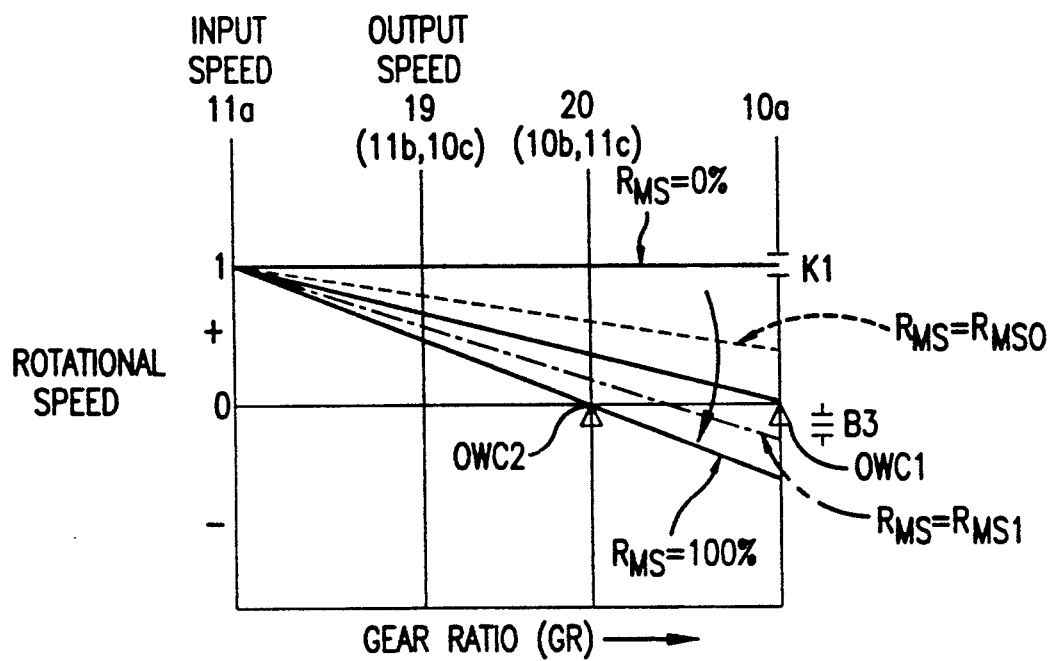
FIG.5
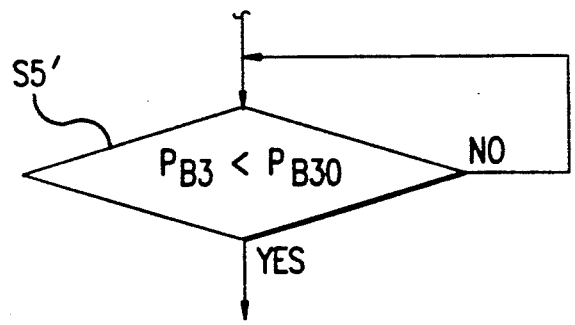
FIG.6
| TORQUE $T_{B3}$ | -- | Q1 | Q2 | Q3 | Q4 | ............ | -- | -- |
|---|---|---|---|---|---|---|---|---|
| PRESSURE $P_{B30}$ | -- | P1 | P2 | P3 | P4 | ............ | -- | -- |
FIG.7

SHIFT CONTROL SYSTEM FOR AUTOMOBILE AUTOMATIC TRANSMISSION

BACKGROUND OF THE INVENTION

1. Field of the Invention

The present invention relates to a shift control system for an automatic transmission for an automobile and, more particularly, to an automatic transmission shift control system for an automobile which reduces shift shock.

2. Description of Related Art

Automatic transmissions for automotive vehicles typically include first or primary transmission means, selectively shiftable into first to third speed gears, and second or secondary transmission means, selectively shiftable into low and high speed gears. The automatic transmissions are each shifted into various forward speeds by combinations of speed gears of the primary and secondary transmission means.

In such an automatic transmission, an automatic shift may occur in which the primary transmission means shifts to a high speed gear while the secondary transmission means shifts to a lower speed gear. Alternatively, the automatic shift may involve a shift of the primary transmission means to a low speed gear while the secondary transmission means shifts to a higher speed gear. When a shift in which the primary and secondary transmission means are "inverse" in shift direction relative to each other occurs, the shift typically causes what is called "shift shock."

In a specific situation, an automatic transmission may shift from one speed to another speed by skipping over an intermediate speed. In such a situation, a transitional shift to the intermediate speed may occur. For example, a down-shift from a fourth speed to a second speed may be performed by skipping over an intermediate speed, namely, a third speed. For such a down-shift, the primary transmission means shifts down from a third speed gear to a first speed gear, skipping a second speed gear, while the secondary transmission shifts up from a lower speed gear to a higher speed gear. If an up-shift of the secondary transmission means is completed while the second speed gear is transitionally created by the primary transmission means, the automatic transmission will temporarily complete an up-shift to the third speed during the fourth to second (4-2) down-shift. If this occurs, a steep decline in transmitting torque in the automatic transmission is produced. The steep torque decline produces a shift shock which is physically felt by the driver. Such a shift shock, due to a steep torque decline, is induced during any up-shift which skips over an intermediate speed as well as a down-shift which skips over an intermediate speed.

SUMMARY OF THE INVENTION

It is an object of the present invention to provide a shift control system for an automatic transmission, having primary and secondary transmission means, which can suppress shift shock even when the respective gear ratios of the primary and secondary transmission means are changed in opposite directions in specific automatic transmission shifts.

The object of the present invention mentioned above is accomplished by providing a particular shift control system for an automatic transmission having primary transmission means, changeable to at least three primary gear ratios, and secondary transmission means, changeable to at least two secondary gear ratios, for shifting the automatic transmission into a plurality of forward speeds. In a specific drive condition of an automotive vehicle, in which the automatic transmission shifts from one forward speed to another forward speed by skipping an intermediate speed, the primary gear ratio of the primary transmission means increases or decreases by changing from one primary gear ratio to another primary gear ratio via an intermediate primary gear ratio between the two primary gear ratios. The secondary transmission means decreases or increases a secondary gear ratio at the same time. Progress in changing the gear ratio of the primary transmission means is monitored so that the shift control system causes the secondary transmission means to start changing a secondary gear ratio in a reverse direction only when a primary gear ratio of the primary transmission means reaches the intermediate primary gear ratio.

More specifically, the shift control system includes a first hydraulically operated frictional coupling element, such as a brake, which changes between locked and unlocked conditions when the primary transmission means changes from the one of the primary gear ratios to the intermediate primary gear ratio. The shift control system further includes a second hydraulically operated frictional coupling element which changes between locked and unlocked conditions when the secondary transmission means changes between the two secondary gear ratios. The second frictional coupling element is caused to start changing between the locked and unlocked conditions either when a predetermined speed ratio between input and output speeds of the primary transmission means is determined to be present or when a predetermined level of pressure applied to the first hydraulically operated frictional coupling element is detected.

BRIEF DESCRIPTION OF THE DRAWINGS

The above and other objects and features of the present invention will be clearly understood from the following description of a preferred embodiment thereof when considered in conjunction with the appended drawings, in which:

FIG. 5 is a diagram showing gear ratio change rates;

FIG. 6 is a flow chart partially illustrating a variation of the 4-2 down-shift control shown in FIG. 3; and FIG. 7 is a map of line pressure applied to a brake necessary to start locking a clutch during a 4-2 down-shift.

DESCRIPTION OF THE PREFERRED EMBODIMENTS

Figure 1:
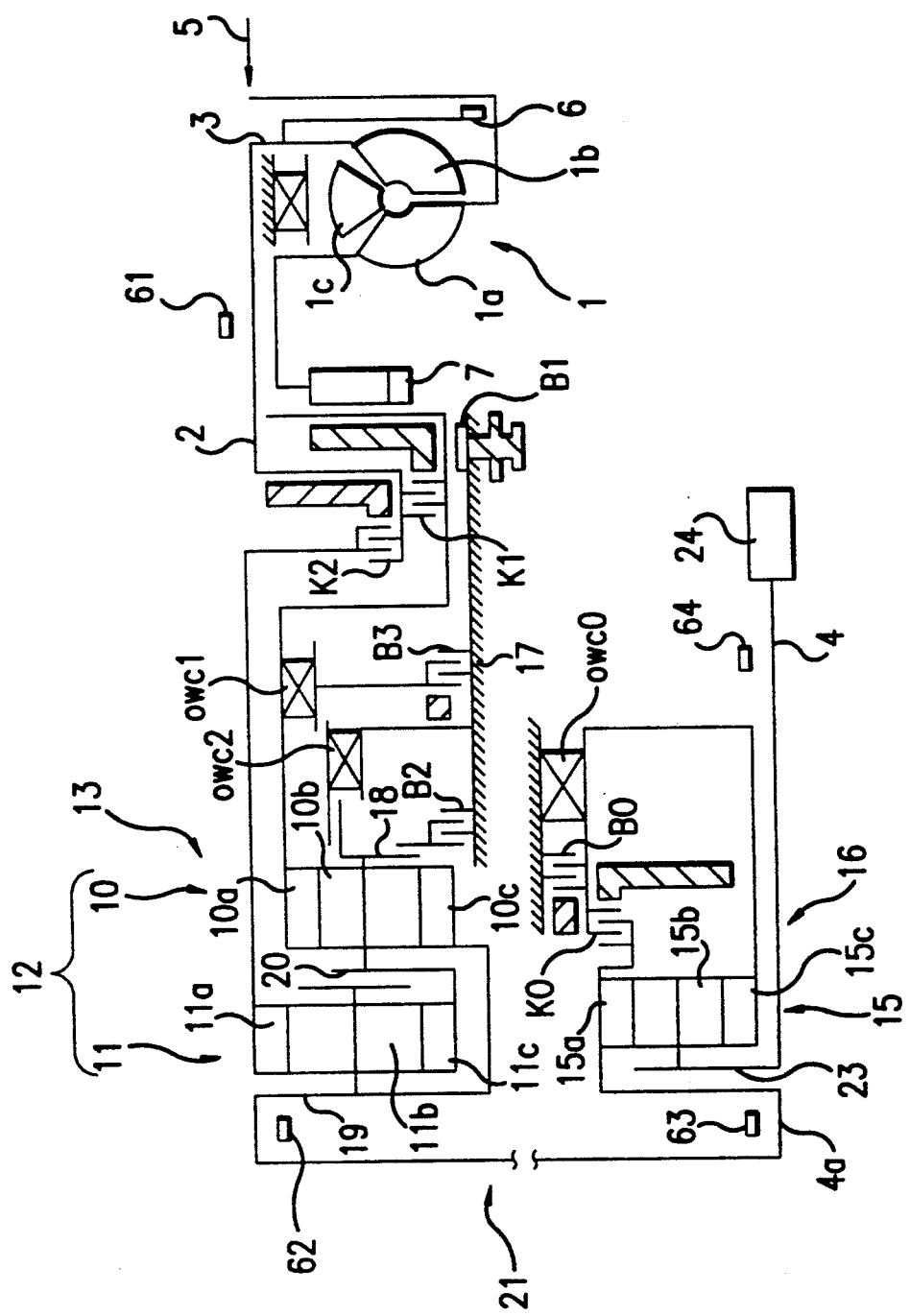
FIG. 1 is a skeleton diagram showing an automatic transmission having five forward speeds controlled by a shift control system in accordance with a preferred embodiment of the present invention.

FIG. 1 shows an automatic transmission having two parallel shafts and five forward speeds. The automatic transmission has a first or input shaft 2, connected with an output or turbine shaft of a torque converter 1, and a second or output shaft 4, arranged parallel to the first shaft 2. The torque converter 1 is of a well known type of torque converter and has an impeller or pump 1a fastened to an engine output shaft 5, such as an engine crankshaft. The torque converter also includes a turbine 1b, fastened to the turbine shaft 3, and a stator 1c, disposed between the pump 1a and the turbine 1b. The torque converter 1, if necessary, may be equipped with a lock-up clutch 6, which itself is well known in structure and operation. The lock-up clutch 6 mechanically couples the engine output shaft 5 and the turbine shaft 3. The pump 1a is operationally coupled to a hydraulic oil pump 7.

The automatic transmission has a primary or first transmission 13 and a secondary or second transmission 16 mounted on the juxtaposed first and second shafts 2 and 4, respectively. The primary transmission 13, having three forward speeds, includes a first planetary gear mechanism 12 having a front planetary gearset 10 and a rear planetary gearset 11 mounted coaxially on the first shaft 2. The secondary transmission 16, having two forward speeds, includes a second planetary gear mechanism 15. The front planetary gearset 10 has a sun gear 10a capable of being coupled to the first shaft 2 through a frictional coupling element, such as a clutch K1, and a transmission casing 17 through a frictional coupling element, such as a brake B1. The sun gear 10a is further capable of being coupled to the transmission casing 17 by a frictional coupling element, such as a brake B3, through a one-way clutch OWC1. The planetary gear set 10 also has a planetary gear 10b, a front carrier 18 disposed in front of the planetary gear 10b and a rear carrier 20 disposed behind the planetary gear 10b. The front carrier 18 is capable of being coupled to the transmission casing 17 by a one-way clutch OWC2 and by a frictional coupling element, such as a brake B2. The rear planetary gearset 11 has a sun gear 11a capable of being coupled to the first shaft 2 through a frictional coupling element, such as a clutch K2, a planetary gear 11b, and a rear carrier 19 operationally coupled to a ring gear 10c of the front planetary gearset 10. The planetary gearset 11 also has a ring gear 11c operationally coupled to the rear carrier 20 of the front planetary gearset 10. Between the primary transmission 13 and the secondary transmission 16, a train of counter gears 21 is provided. The engine output torque is transmitted from the first shaft 2 to the second shaft 4 through the train of counter gears 21.

The second planetary gear mechanism 15, which is assigned to shifting between a high speed gear and a low speed gear, has a ring gear connected with one of the counter gears 21 and capable of being coupled to a sun gear 15c by a frictional coupling element, such as a brake K0. The sun gear 15c is capable of being coupled to the transmission casing 17 by a one-way clutch OWC0 and by a frictional coupling element, such as a brake B0. The second planetary gear mechanism 15 further has a carrier 23 connected with a rear end of the second shaft 4 opposite to an end at which an output gear 24 is fastened. The shaded elements in FIG. 1 are pistons for the various frictional coupling elements.

Brakes K0, K1 and K2, brakes B0, B1, B2 and B3, and one-way clutches OWC0, OWC1 and OWC2 are selectively coupled or locked and uncoupled or unlocked so as to shift the automatic transmission to five forward speed gears, as is shown in Table I. In Table I, each frictional coupling element is indicated as being locked or coupled by the symbol "ON." A frictional coupling element is indicated as being locked or coupled only when engine braking is needed by the symbol "(ON)." Otherwise, the frictional coupling element is unlocked or uncoupled.

TABLE I

|     | K0 | K1 | K2 | B0 | B1 | B2   | B3   | OWC0 | OWC1 | OWC2 |
|-----|----|----|----|----|----|------|------|------|------|------|
| 1ST |    |    | ON | ON |    | (ON) |      | ON   |      | ON   |
| 2ND | ON |    | ON |    |    | (ON) |      |      |      | ON   |
| 3RD |    |    | ON | ON |    | (ON) |      | ON   | ON   | ON   |
| 4TH |    | ON | ON | ON |    |      |      | ON   | ON   |      |
| 5TH | ON | ON | ON |    |    |      |      | ON   |      |      |

The frictional coupling elements, which are coupled and uncoupled for first (1ST) to fifth (5TH) speeds as shown in Table I, place the primary transmission 13 and the secondary transmission 16 into specific speed gears so as to provide the total speed or gear ratios shown in Table II. A total speed or gear ratio is the ratio of a rotational speed of the second or output shaft 4 to a rotational speed of the first or input shaft 2.

TABLE II

| Gear | | Gear Ratio | | Total |
|---|---|---|---|---|
| Primary | Secondary | Primary | Secondary | Gear Ratio |
| 1ST | 1ST | Low  | 2.9 | 1.5 | 4.35 |
| 2ND | 1ST | High | 2.9 | 1.0 | 2.9  |
| 3RD | 2ND | Low  | 1.4 | 1.5 | 2.1  |
| 4TH | 3RD | Low  | 1.0 | 1.5 | 1.5  |
| 5TH | 3RD | High | 1.0 | 1.0 | 1.0  |

When the automatic transmission shifts from the fourth speed to the second speed by skipping over the third speed, the gear of the primary transmission 13 is changed from the third speed gear to the first speed gear by skipping over the second speed gear. Simultaneously, the gear of the secondary transmission 16 is changed from the low speed gear to the high speed gear. In other words, as is understood from Table II, the gear of the primary transmission 13 is changed so that the gear ratio is increased from 1.0 to 2.9, and the gear of the secondary transmission 16 is changed so that the gear ratio is decreased from 1.5 to 1.0. As is apparent from Table I, for a down-shift of the automatic transmission from the fourth speed to the second speed, the primary transmission 13 releases the clutch K1 and the brake B3. Because the clutch K1 is released quickly, the brake B3 operates relatively sluggishly as compared to the quickness with which the clutch K1 is released. Consequently, the primary transmission 13 may create the same state as the second speed gear. As a result, while the secondary transmission 16 changes the gear ratio from 1.5 to 1.0, the primary transmission 13 changes the gear ratio from 1.0 to only 1.4. At this time, the automatic transmission increases the total gear ratio to 1.4 from 1.0. This indicates that although it is intended to shift the automatic transmission down, an up-shift before actual completion of the down-shift transitionally arises. When such a transitional up-shift during a down-shift occurs, a temporary rise of output torque is caused by the automatic transmission. This temporary rise of output torque is felt as shift shock by an automotive vehicle occupant.

Operation of the frictional coupling elements, formed by the clutches K0 and K1 and the brake B3, is controlled by selectively locking and unlocking the frictional coupling elements. This is done by a hydraulic control system shown in FIG. 2. The automatic transmission is provided with various sensors, such as a speed sensor 61 for detecting a torque converter output speed, a speed sensor 62 for detecting a primary transmission output speed, a speed sensor 63 for detecting a secondary transmission input speed, a speed sensor 64 for detecting a secondary transmission output speed, a pressure sensor 65 for detecting a hydraulic pressure acting on the clutch K0, and a pressure sensor 66 for detecting a hydraulic pressure acting on the brake B3.

Figure 2:
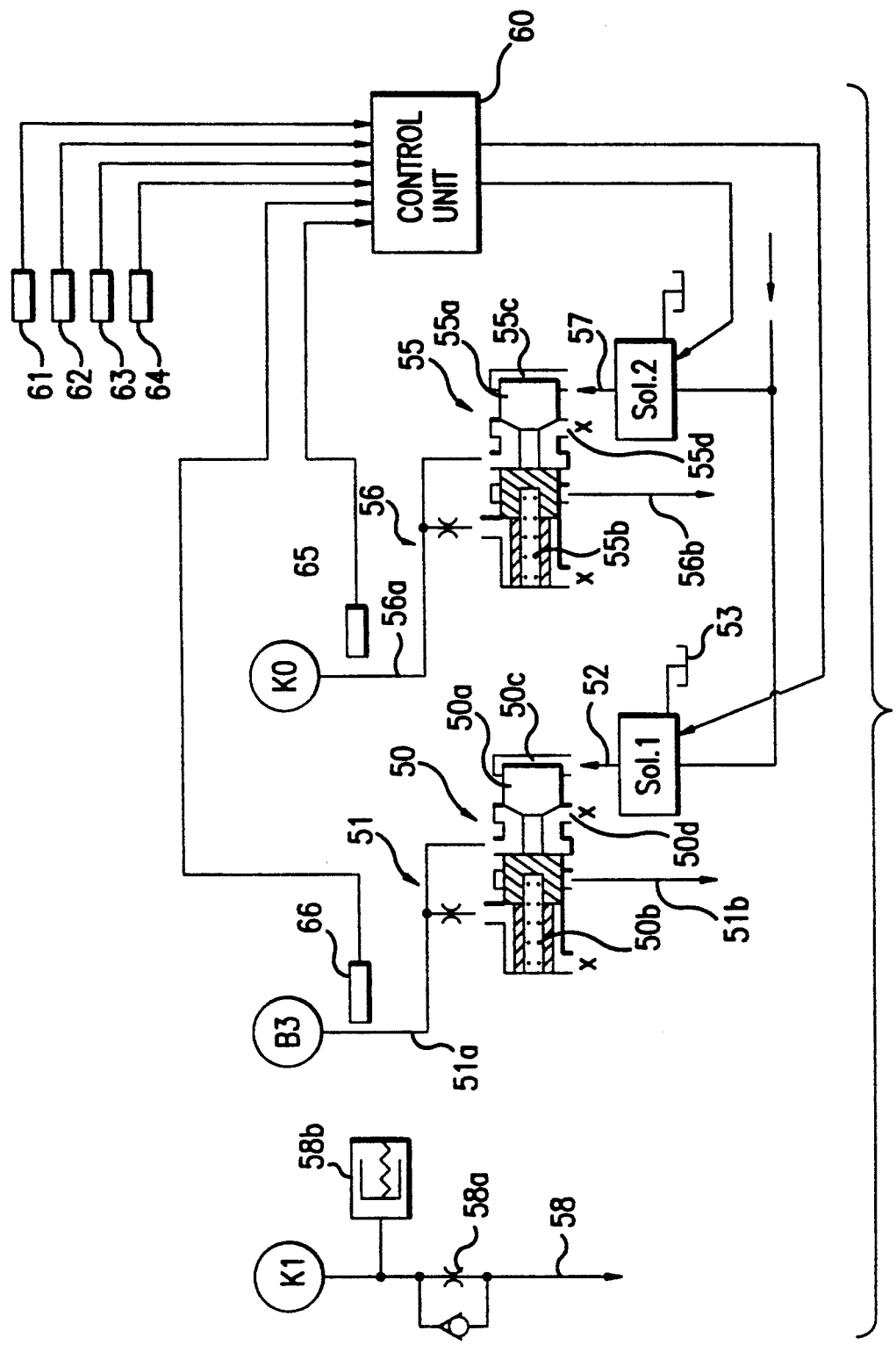
FIG. 2 is a hydraulic control circuit for the shift control system.

FIG. 2 shows the hydraulic control system as including shift valves 50 and 55 for locking and unlocking the brake B3 and the clutch K0, respectively. The shift valve 50 is disposed in a pressure line 51 leading to the brake B3 which passes through a pressure line from a manual shift valve (not shown). The manual shift valve is manually shifted by a driver to select one of a number of speed gear ranges. Such speed gear ranges include a first or low (1) speed range, a second or high (2) speed range, a drive (D) range, a neutral (N) range, a reverse (R) range and a park (P) range. The shift valve 50 has a spool 50a, urged toward the right side, as viewed in FIG. 2, by a return spring 50b, on which a pressure in the downstream portion 51a of the pressure line 51 acts. The shift valve 50 is formed with a pressure chamber 50c on one side (for instance the right side) of the spool 50a and a drain port 50d. The pressure chamber 50c is connected with a pilot pressure line 52 having a duty solenoid SOL1 disposed therein. The duty solenoid SOL1 controls a duty rate at which the pilot pressure line 52 communicates and is cut off from a pressure oil tank 53 to regulate the pressure of oil in the pilot pressure line 52 and shift the spool 50a in opposite directions, thereby selectively communicating the downstream portion 51a of the pressure line 51 with an upstream portion 51b of the pressure line 51 and the drain port 50d. In this manner the pressure in the downstream portion 51a of the pressure line 51, which acts on the brake B3, is varied according to pressure in the pilot pressure line 52.

The shift valve 55 is disposed in a pressure line 56 leading to the clutch K0. Because of the identity of their structures and operations, elements associated with the shift valve 55 are designated by the same reference numerals and same alphabetic letters as the corresponding elements of the shift valve 50 and are not individually discussed. A hydraulic pressure in the pilot pressure line 57 is controlled by a duty solenoid SOL2 so as to regulate the hydraulic pressure acting on the clutch K0.

The clutch K1 in the primary transmission 13 is connected with a pressure line 58 through which a hydraulic pressure is supplied, via the manual shift valve, when the automatic transmission shifts to the fifth speed and the fourth speed. In the pressure line 58, a throttle valve 58a and an accumulator 58b are provided for causing the hydraulic pressure supplied to the clutch K1 to rise gently. The duty solenoids SOL1 and SOL2 are controlled by a control unit 60 having a built-in microcomputer, e.g., a central processing unit (CPU). The control unit 60 receives various signals from the speed sensors 61, 62, 53 and 64 and the pressure sensors 65 and 66.

Figure 3:
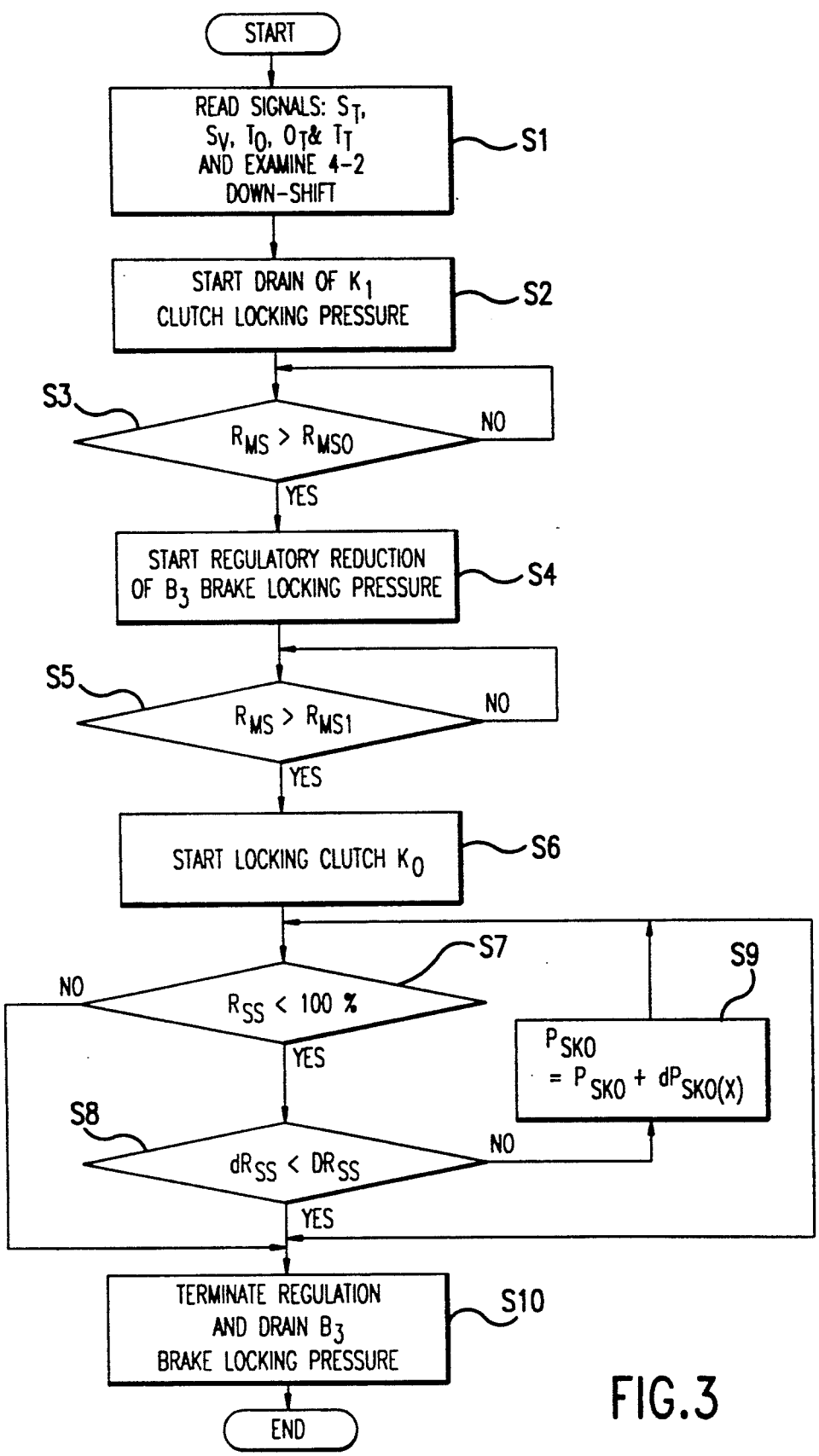
FIG. 3 is a flow chart illustrating a 4-2 down-shift control.

The operation of the clutches K0 and K1 and the brake B3 during a down-shift from the fourth speed to the second speed of the automatic transmission is best understood by reviewing FIG. 3, which is a flow chart illustrating a frictional coupling element control sequence routine for the microcomputer of control unit 60. Programming a computer is a skill well understood in the art. The following description is written to enable a programmer having ordinary skill in the art to prepare an appropriate program for the microcomputer. The particular details of any such program would, of course, depend upon the architecture of the particular computer selected. It is to be noted that the term "gear ratio (GR) change rate" as used in the frictional coupling element control sequence routine is defined as follows:

$$R = [1 - (a/b - G_m)/(G_n - G_m)] \times 100\%,$$

wherein
(1) R is a gear ratio (GR) change rate of a transmission at a certain time during a n-th to m-th down-shift;
(2) a is an input rotational speed of the transmission;
(3) b is an output rotational speed of the transmission;
(4) $G_m$ is a gear ratio of the m-th speed gear; and
(5) $G_n$ is a gear ratio of the n-th speed gear.

At step S1 of the program represented in FIG. 3, various information signals representative of a turbine speed ($S_T$), a vehicle speed ($S_V$), a throttle opening ($T_O$), the temperature of oil ($O_T$) in the automatic transmission and a turbine output torque ($T_t$) are all detected by well known sensors or detectors. Based on these signals, an examination is made of whether of not a down-shift from the fourth speed to the second speed (hereafter referred to as a 4-2 down-shift) must be induced. This examination is made by searching an automatic shift control map in a manner which is well known in the art. Only when the 4-2 down-shift must be induced does the frictional coupling element control sequence proceed forward so as to selectively lock and unlock the clutches K0 and K1 and the brake B3. After initiating draining of hydraulic fluid to reduce the hydraulic pressure acting on the clutch K1 for locking at step S2, a decision is made at step S3 as to whether or not a present gear ratio (GR) change rate $R_{MS}$ in the primary transmission 13 during the 4-2 down-shift is larger in percentage than a first specific gear ratio (GR) change $R_{MS0}$. This first specific gear ratio (GR) change rate $R_{MS0}$ is set for a predetermined input to output rotational speed ratio (a/b) of the primary transmission 13 between the fourth speed gear ratio of 1.0 and the second speed gear ratio of 2.9 of the primary transmission 13 so that when the primary transmission 13 reaches the first specific gear ratio (GR) change rate $R_{MS0}$, the brake B3 starts to be unlocked. If the gear ratio (GR) change rate $R_{MS}$ is equal or less than the first specific gear ratio (GR) change rate $R_{MS0}$, the progress of unlocking of the clutch K1, and hence the progress of the 4-2 down-shift, is examined and monitored until the answer to the decision made at step S3 becomes "YES." When the answer to the decision made at step S3 becomes "YES," the brake B3 starts unlocking when hydraulic pressure supplied to the brake B3 is lowered at step S4. Subsequently, a decision is made at step S5 as to whether or not the present gear ratio (GR) change rate $R_{MS}$ is larger than a second specific gear ratio (GR) change rate $R_{MS1}$, which is larger than the first specific gear ratio (GR) change rate $R_{MS0}$. The second specific gear ratio (GR) change rate $R_{MS1}$ is set forth for a predetermined input to output rotational speed ratio (a/b) of the primary transmission 13 between the fourth speed gear ratio of 1.0 and the second speed gear ratio of 2.9 so that when the primary transmission 13 reaches the first specific gear ratio (GR) change rate $R_{MS0}$, the clutch K0 starts to be locked. As long as the gear ratio (GR) change rate $R_{MS}$ is less than the second specific gear ratio (GR) change rate $R_{MS1}$, the clutch K0 is prevented from being locked until the brake B3 is unlocked. When the gear ratio (GR) change rate $R_{MS}$ becomes larger and then reaches the second specific gear ratio (GR) change rate $R_{MS1}$, the clutch K0 is caused to start locking at step S6.

Thereafter, a decision is made at step S7 as to whether or not a present gear ratio (GR) change rate $R_{SS}$ of the secondary transmission 16 during the 4–2 down-shift is less than 100%, which is the rate obtained when the secondary transmission 16 completes a shift to the second speed from the fourth speed. If the answer to the decision made at step S7 is "YES," the secondary transmission 16 is still in the 4–2 down-shift operation. Then, an absolute deviation $dR_{SS}$ of the present gear ratio (GR) change rate $R_{SS}$ from a target ratio (GR) change rate $R_{TSS}$ is calculated and compared with an allowable deviation $DR_{SS}$ at step S8. The target gear ratio (GR) change rate $R_{TSS}$ is set so as to increase with an increase in the gear ratio (GR) change rate $R_{MS}$ of the primary transmission 13 during the 4–2 down-shift. If the deviation $dR_{SS}$ is larger than the allowable deviation $DR_{SS}$, a correction is performed at step S9 so as to increase a line pressure $P_{SK0}$ necessary to lock the clutch K0 of the secondary transmission 16 by a correction pressure $dP_{SK0(X)}$ in a line pressure feedback control. After the line pressure correction is performed at step S9 and when the deviation $dR_{SS}$ becomes equal to or less than the allowable deviation $DR_{SS}$, the decision is again made at step S7 and repeated until the present gear ratio (GR) change rate $R_{SS}$ of the secondary transmission 16 becomes 100% and the secondary transmission 16 has completed the 4–2 down-shift. When the secondary transmission 16 completes the 4–2 down-shift, after quickly draining hydraulic fluid from the brake B3 to reduce the brake locking pressure at step S10, the frictional coupling element control sequence ends.

As is apparent from the description above of the flow chart shown in FIG. 3 representing the frictional coupling element control sequence routine, during a 4–2 down-shift, when it is determined that the present gear ratio (GR) change rate $R_{MS}$ of the primary transmission 13 has approximately reached the second specific gear ratio (GR) change rate $R_{MS1}$ at step S5, it is judged that the brake B3 is in a predetermined locked condition, which is near a completely locked condition. Subsequently, when it is determined that the predetermined locked condition of the brake B3 is present, the clutch K0 is switched from an unlocked condition to a locked condition to start the shift operation of the secondary transmission 16 at step S6.

Figure 4:
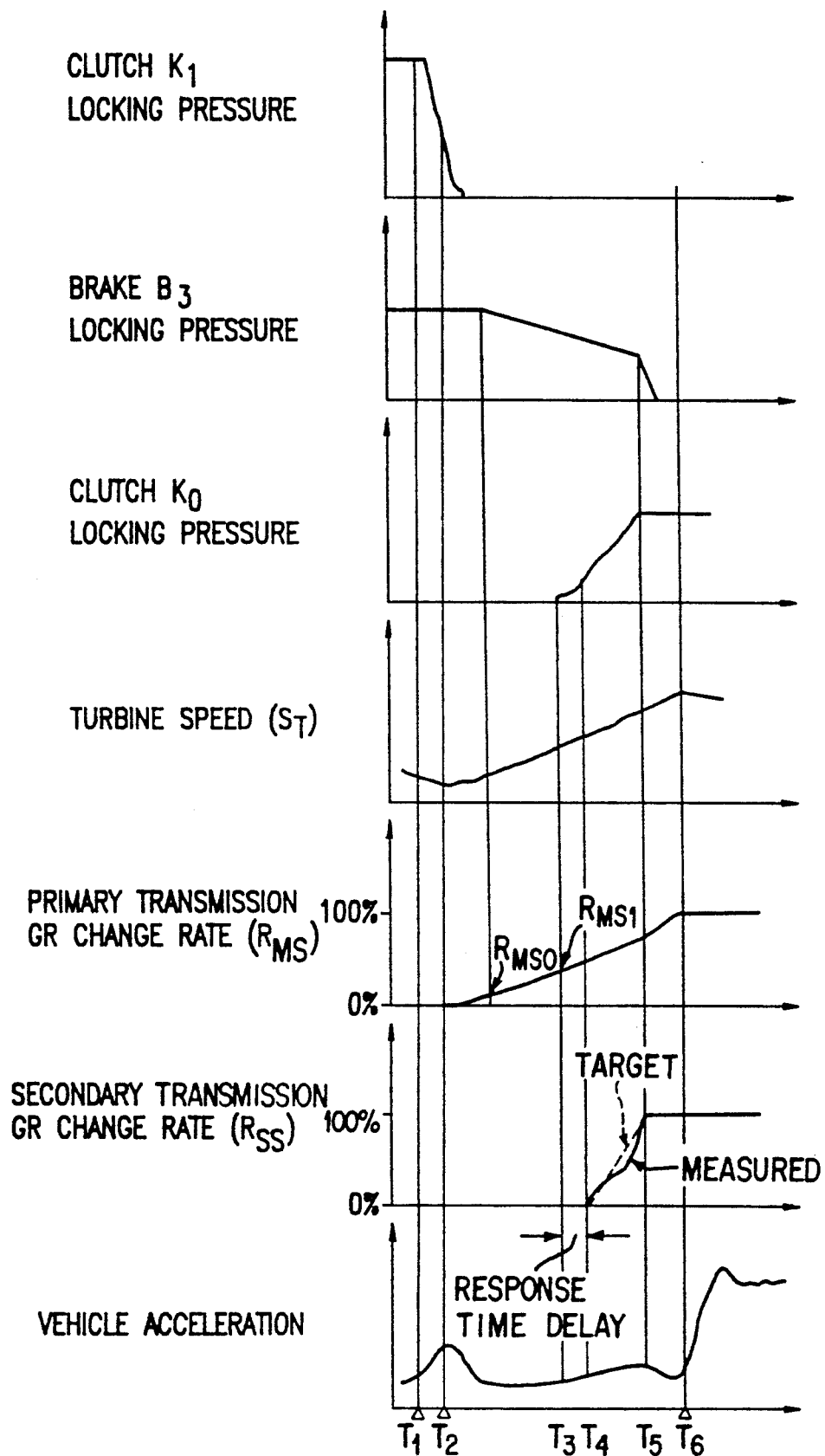
FIG. 4 shows time charts of various factors which change during a 4-2 down-shift.

FIG. 4 is a time chart for the frictional coupling element control. As FIG. 4 shows, when a demand for a 4–2 down-shift is received by the automatic transmission at a time $T_1$, the locking pressure supplied to the clutch K1 of the primary transmission 13 starts to drop as hydraulic pressure supplied to the clutch K1 begins to drain. With a drop in locking pressure supplied to the clutch K1, the primary transmission 13 increases its gear ratio (GR) change rate $R_{MS}$. As soon as the primary transmission 13 begins to increase the gear ratio (GR) change rate $R_{MS}$, the turbine speed of the torque converter 1 stops falling and starts to rise; this occurs at a time $T_2$. When the primary transmission 13 increases the gear ratio (GR) change rate $R_{MS}$ to the first specific gear ratio (GR) change rate $R_{MS0}$ at a time $T_3$, the locking pressure supplied to the brake B3 of the primary transmission 13 starts to drop as hydraulic fluid supplied to the brake B3 begins to drain. The progress in dropping of locking pressure supplied to the brake B3 is controlled by the duty solenoid SOL1 of the shift valve 50 so as to gradually unlock the brake B3. This causes the primary transmission 13 to further increase the gear ratio (GR) change rate $R_{MS}$ so that it approaches the gear ratio for the second speed. When the primary transmission 13 increases the gear ratio (GR) change rate $R_{ms}$ to the first specific gear ratio (GR) change rate $R_{ms1}$ at a time $T_4$, it starts, for the first time, to supply a locking pressure to the clutch K0 of the secondary transmission 16. After a time delay dT in response to the supply of the locking pressure has elapsed, locking of the clutch K0 starts at step $T_5$. Consequently, the secondary transmission 16 increases the gear ratio (GR) change rate $R_{SS}$. Thereafter, as the primary transmission 13 increases the gear ratio (GR) change rate $R_{MS}$ following the decrease in locking pressure supplied to the brake B3, the locking pressure supplied to the clutch K0 of the secondary transmission 16 is feedback controlled so that the secondary transmission 16 increases the gear ratio (GR) change rate $R_{SS}$ along a line of data representing a target gear ratio (GR) change rate shown by a chained line in FIG. 4.

When the secondary transmission 16 increases the gear ratio (GR) change rate $R_{SS}$ to 100% and shifts to the high speed gear, the locking pressure provided by fluid supplied to the clutch K0 of the secondary transmission 16 is kept unchanged. Simultaneously, speed controlled unlocking of the brake B3 of the primary transmission 13 is terminated, so that a quick draining of hydraulic fluid and a rapid drop in locking pressure take place. When the primary transmission 13 increases the gear ratio (GR) change rate $R_{MS}$ up to 100% at a time $T_6$, the automatic transmission establishes an intended total gear ratio of 2.9 and finishes the 4–2 down-shift.

After that time at which the automatic transmission finishes the 4–2 down-shift, the turbine speed of the torque converter 1 is lowered. At the time $T_4$, the primary transmission 13 increases the gear ratio (GR) change rate $R_{MS}$ to the first specific gear ratio (GR) change rate $R_{MS1}$. In other words, when the clutch K1 is completely released and the brake B3 of the primary transmission 13 is somewhat unlocked so as to establish the second gear in the primary transmission 13, locking the clutch K0 of the secondary transmission 16 starts for the first time. Consequently, during the 4–2 down-shift, the automatic transmission continuously increases the total gear ratio so as to shift down from the fourth speed to the second speed without temporarily shifting up. This results in a smooth change in output torque and, hence, a smooth change in acceleration as shown in FIG. 4, so that the automatic transmission reduces shift shock effectively. Additionally, because shifting of the secondary transmission 16 is started only when it is detected that the primary transmission 13 has changed the gear ratio (GR) change rate $R_{MS}$ to the first specific gear ratio (GR) change rate $R_{MS1}$, and because the detection is made exactly and easily, the automatic transmission reliably reduces shift shook.

The frictional coupling element control sequence routine illustrated by the flow chart shown in FIG. 3 may be partly modified as shown in FIG. 6. That is, the detection of commencement of locking of the clutch K0 may be made when locking pressure to the brake B3 reaches a predetermined level instead of when the gear ratio (GR) change rate $R_{MS}$ reaches the first specific gear ratio (GR) change rate $R_{MS1}$.

FIG. 6 shows a partial modification of the frictional coupling element control sequence routine. At step S5' of the partial routine shown in FIG. 6, a decision is made as to whether or not a locking pressure $P_{B3}$ acting on the brake B3 has reached a predetermined pressure $P_{B30}$ which should develop when the gear ratio (GR) change rate $R_{MS}$ of the primary transmission 13 reaches the first specific gear ratio (GR) change rate $R_{MS1}$. Since the locked condition of the brake B3 of the primary transmission 13 changes according to torque acting on the brake B3, namely, a turbine torque, the predetermined pressures $P_{B30}$ is varied according to torque acting on the brake B3. Various predetermined pressures $P_{B30}$ are previously established stepwise for various torques and stored in the RAM of control unit 60 in the form of a map.

It is to be understood that although specific preferred embodiments of the present invention have been described, various other embodiments and variants may occur to those skilled in the art. Any such other embodiments and variants which fall within the scope and spirit of the invention are intended to be covered by the following claims.

What is claimed is:

1. In combination, an automatic transmission and a shift control system for the automatic transmission, the automatic transmission having primary transmission means, changeable to at least three primary gear ratios at which input torque to said primary transmission means can be fully transmitted, and secondary transmission means, changeable to at least two secondary gear ratios at which input torque to said secondary transmission means can be fully transmitted, for shifting said automatic transmission to a plurality of forward speeds in a specific drive condition of an automotive vehicle, said automatic transmission shifting from one of said forward speeds to another of said forward speeds, skipping an intermediate speed between the one of said forward speeds and the other of said forward speeds, said primary transmission means changing from one of said primary gear ratios to another of said primary gear ratios via an intermediate primary gear ratio between the one of said primary gear ratios and the other of said primary gear ratios at which input torque to said primary transmission means is not fully transmitted, said secondary transmission means changing a secondary gear ratio in an opposite direction to that in which said primary transmission means changes a primary gear ratio when shifting from said one of said primary gear ratios to said other of said primary gear ratios, said shift control system comprising:

drive condition detecting means for detecting said specific drive condition;

shift condition detection means for detecting a progression of change of said primary gear ratio through said intermediate primary gear ratio when said drive condition detecting means detects said specific drive condition; and shift control means for causing said secondary transmission means to start a change of the secondary gear ratio in said opposite direction via an intermediate secondary gear ratio, between one of said secondary gear ratios and another of said secondary gear ratios, at which input torque to said secondary transmission is not fully transmitted only when said shift condition detection means detects that the primary gear ratio has reached said intermediate primary gear ratios.

2. An automatic transmission and shift control system combination as defined in claim 1, wherein said shift control means includes a first hydraulically operated frictional coupling element which changes between locked and unlocked conditions when said primary transmission means changes from one of said primary gear ratios to said intermediate primary gear ratio and a second hydraulically operated frictional coupling element which changes between locked and unlocked conditions when said secondary transmission means changes between said at least two secondary gear ratios.

3. An automatic transmission and shift control system combination as defined in claim 2, wherein said shift condition detection means comprises a speed sensor for detecting a speed ratio between input and output speeds of said primary transmission means.

4. An automatic transmission and shift control system combination as defined in claim 3, wherein said shift control means causes said second hydraulically operated frictional coupling element to start changing between said locked and unlocked conditions when said speed sensor detects a predetermined speed ratio between input and output speeds of said primary transmission means.

5. An automatic transmission and shift control system combination as defined in claim 3, wherein said shift condition detection means comprises a pressure sensor for detecting a hydraulic pressure applied to said first hydraulically operated frictional coupling element.

6. An automatic transmission and shift control system combination as defined in claim 5, wherein said shift control means causes said second hydraulically operated frictional coupling element to start changing between said locked and unlocked conditions when said pressure sensor detects a predetermined level of pressure applied to said first hydraulically operated frictional coupling element.

* * * * *